United States Patent Office 2,937,204
Patented May 17, 1960

1

2,937,204
N-ALKANOYL DINITROBENZAMIDES

Guy H. Harris, Concord, Patricia S. Ichioka, Berkeley, and Bryant C. Fischback, Walnut Creek, Calif., assignors to The Dow Chemical Company, Midland, Mich., a corporation of Delaware No Drawing. Application November 25, 1957
Serial No. 698,363

6 Claims. (Cl. 260—558)

This invention relates to benzamides and is particularly directed to N-alkanoyl dinitrobenzamides in which the nitro groups occupy one pair of the 2,4- and 3,5-positions on the benzene ring, and wherein a lower alkyl substituent may be present on the amido nitrogen atom, and a saturated, non-reactive, monovalent substituent containing at least carbon and hydrogen but not more than carbon, hydrogen and oxygen and having a molecular weight of from 15 to 31 may occupy the 6-position on the benzene ring. The term "lower alkyl" is employed in the present specification and claims to refer to the alkyl radicals containing from 1 to 3 carbon atoms, inclusive. Specifically, certain of the compounds within the scope of this invention are N-formyl 3,5-dinitrobenzamide, N-acetyl 3,5-dinitro-2-methoxybenzamide, N-acetyl N-propyl 3,5-dinitro-2-methylbenzamide, N-propionyl 2,4-dinitro-6-ethylbenzamide and N-capryl 3,5-dinitro-2-methylbenzamide.

These new compounds are crystalline solids which are somewhat soluble in many organic solvents and of very low solubility in water. They have been found to be useful as herbicides and are adapted to be employed in dust and spray compositions for the control of the growth and the killing of weeds. They are also valuable for the control of intestinal parasites.

The new compounds may be prepared by the reaction of an alkanoyl halide with a dinitrobenzamide corresponding to the formula

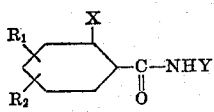

wherein R₁ and R₂ represent nitro groups which occupy one pair of the 2,4- and 3,5-positions on the benzene ring, X represents hydrogen, methoxy, methyl or ethyl and Y represents hydrogen or lower alkyl. Suitable alkanoyl halides include formyl fluoride, acetyl chloride, acetyl bromide, propionyl chloride, butyryl chloride, pentanoyl chloride, hexanoyl chloride, heptanoyl chloride, octanoyl chloride, nonanoyl chloride or decanoyl chloride. The reaction takes place smoothly at the temperature range of from 20° C. to 150° C. with the production of the desired product and hydrogen halide of reaction. Good results are obtained when employing one molecular proportion of the dinitrobenzamide with at least one molecular proportion of the alkanoyl halide. The reaction may be carried out either in the presence of a catalyst such as sulfuric acid, toluene sulfonic acid or a cation exchange resin in the acid form, or, if desired, in the presence of a hydrogen chloride acceptor such as pyridine.

In carrying out the reaction, the dinitrobenzamide, alkanoyl halide, and hydrogen chloride acceptor or catalyst, if employed, are mixed together and the resulting mixture maintained at the contacting temperature range for a period of time. During this period, some of the desired product may separate in the reaction mixture as a crystalline solid. Upon completion of the reaction, the reaction mixture may be cooled to precipitate the desired product or to precipitate further product. The product may be separated by filtration and thereafter purified by conventional procedures.

2

In an alternative method of carrying out the invention, the dinitrobenzamide is reacted with an alkanoic acid anhydride such as acetic anhydride, propionic anhydride, butyric anhydride, valeric anhydride, caproic anhydride, caprylic anhydride or capric anhydride. The reaction is carried out in the presence of a catalyst such as sulfuric acid, toluene sulfonic acid, or a cation exchange resin in the acid form. Good results are obtained when employing one molecular proportion of the dinitrobenzamide with at least one molecular proportion of the alkanoic anhydride. The reaction takes place smoothly at the temperature range of from 0° to 150° C. with the production of the desired product and alkanoic acid of reaction.

In carrying out the reaction, the dinitrobenzamide, alkanoic acid anhydride and catalyst are mixed together and the resulting mixture maintained for a period of time at the contacting temperature range. During this period, some of the desired product may separate in the reaction mixture. Upon completion of the reaction, the desired product is separated as previously described.

The following examples illustrate the invention but are not to be construed as limiting.

Example 1.—N-acetyl 3,5-dinitrobenzamide

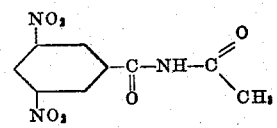

9.6 grams of 3,5-dinitrobenzamide, melting at 178° C., was dispersed in 47 milliliters of acetic anhydride and a few drops of concentrated sulfuric acid added thereto with stirring at room temperature. During the contacting operations, a product precipitated in the reaction mixture as a crystalline solid. The reaction mixture was set aside at room temperature for 60 hours and thereafter filtered and the residue washed with water and dried under vacuum. As a result of these operations, there was obtained an N-acetyl 3,5-dinitrobenzamide product as a pale yellow solid which melted at 198°–200° C. This product was found to contain 42.7 percent carbon and 2.79 percent hydrogen which corresponds to the theoretical values.

Example 2.—N-propionyl 3,5-dinitrobenzamide

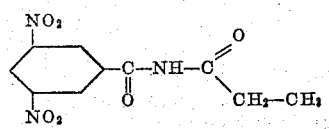

This compound was prepared by the method described in Example 1 by the reaction of 9.6 grams of 3,5-dinitrobenzamide and 58 milliliters of propionic anhydride in the presence of a few drops of concentrated sulfuric acid as a catalyst. During the contacting period, a product precipitated in the reaction mixture as a crystalline solid and was removed by filtration, washed with water and dried under vacuum. As a result of these operations, there was obtained an N-propionyl 3,5-dinitrobenzamide product as a cream-colored solid which melted at 183.5°–185° C. This product was found to contain 45.4 percent carbon and 3.4 percent hydrogen which corresponds to the theoretical values.

Example 3.—N-acetyl 3,5-dinitro-2-methylbenzamide

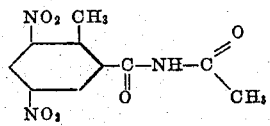

Twenty-five grams of 3,5-dinitro-2-methylbenzamide, melting at 176° C., 300 milliliters of acetic anhydride and 5 milliliters of concentrated sulfuric acid were mixed together and stirred for one hour at room temperature. The reaction mixture was then allowed to stand for one hour during which time a crystalline product precipitated in the reaction mixture and was removed by filtration, washed successively with acetic acid and water and air-dried. The filtrate was poured into a mixture of ice and water to precipitate more product which was separated by filtration, washed with water and air-dried. The crystalline products were then combined and the combined product recrystallized from ethanol. As a result of these operations, there was obtained an N-acetyl 3,5-dinitro-2-methylbenzamide product as a light yellow solid which melted at 202°–205° C. This product was found to contain 45.3 percent carbon and 3.8 percent hydrogen compared to the calculated values of 45.0 and 3.4 percent, respectively.

*Example 4.—N-propionyl 3,5-dinitro-2-methylbenzamide*

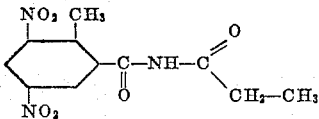

Five milliliters of concentrated sulfuric acid was added portionwise with stirring at room temperature to a mixture of 22.5 grams of 3,5-dinitro-2-methylbenzamide and 190 milliliters of propionic anhydride. Some product precipitated after 30 minutes. The reaction mixture was then allowed to stand at room temperature for 16 hours and thereafter cooled to 0° C. to precipitate further product. The product was separated by filtration, washed with water and air-dried. Upon recrystallization from ethanol, there was obtained an N-propionyl 3,5-dinitro-2-methylbenzamide product as a pale yellow solid which melted at 179°–180° C. This product was found to contain 47.3 percent carbon as compared to a calculated value of 47.1 percent.

*Example 5.—N-valeryl 3,5-dinitro-2-methylbenzamide*

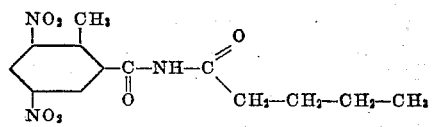

5.6 grams of 3,5-dinitro-2-methylbenzamide, 55 milliliters of valeric anhydride and 0.5 milliliter of concentrated sulfuric acid were mixed together and heated with stirring at a temperature of from 60° to 70° C. for a short period during which time a product precipitated in the mixture as a solid material. The reaction mixture was allowed to stand at room temperature for a period of 16 hours during which time more product precipitated. Following this period, the mixture was poured into a mixture of ice and water and a small amount of sodium bicarbonate added thereto. The mixture was then filtered and the residue washed with water and recrystallized from ethanol to obtain an N-valeryl 3,5-dinitro-2-methylbenzamide product as a crystalline solid which melted at 164.7°–165.5° C. This product was found to contain 50.8 percent carbon, 5.0 percent hydrogen and 13.7 percent nitrogen compared to the theoretical values of 50.5, 4.9 and 13.6 percent, respectively.

*Example 6.—N-formyl 3,5-dinitro-2-methylbenzamide*

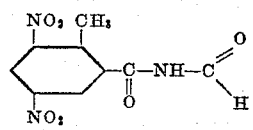

A stoichiometric excess of gaseous formyl fluoride is bubbled into 22.5 grams of 3,5-dinitro-2-methylbenzamide and a few drops of concentrated sulfuric acid dispersed in 400 milliliters of dioxane. The addition is carried out over a period of 25 minutes and at a temperature of 50° C. Upon completion of the addition, the reaction mixture is poured on ice to precipitate an N-formyl 3,5-dinitro-2-methylbenzamide product which is thereafter separated by filtration and recrystallized from ethanol. N-formyl 3,5-dinitro-2-methylbenzamide has a molecular weight of 253.

*Example 7.—N-acetyl 3,5-dinitro-2-ethylbenzamide*

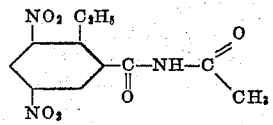

4.8 grams of 2-ethyl-3,5-dinitrobenzamide (melting at 176° C.), 20.8 milliliters of acetic anhydride and 2 drops of concentrated sulfuric acid were mixed together and heated with stirring at a temperature of 100° C. for a period of thirty minutes. The reaction mixture was then allowed to stand at room temperature for 17 hours and thereafter poured into a mixture of ice and water to precipitate an N-acetyl 3,5-dinitro-2-ethylbenzamide product as a crystalline solid which was separated by filtration, washed with cold water and air-dried. This product was recrystallized from ethanol and found to melt at 158°–160° C. The product contained 46.7 percent carbon, 3.8 percent hydrogen and 14.9 percent nitrogen compared to the theoretical values of 47.0, 3.9 and 15.0 percent, respectively.

*Example 8.—N-acetyl-N-methyl 3,5-dinitro-2-methylbenzamide*

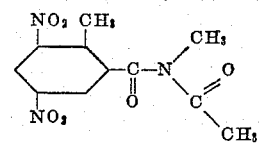

Ten grams of N-methyl 3,5-dinitro-2-methylbenzamide (melting at 187° C.), 150 milliliters of acetic anhydride and 3 milliliters of concentrated sulfuric acid were mixed together and heated with stirring at a temperature of 75° C. for a period of 15 minutes. The reaction mixture was then poured into a mixture of ice and water to precipitate a product which was separated by filtration, washed with water and air-dried. Upon recrystallization from methanol, there was obtained an N-acetyl-N-methyl 3,5-dinitro-2-methylbenzamide product as a white crystalline solid which melted at 148.2–149.5° C. This product was found to contain 47.1 percent carbon, 3.9 percent hydrogen and 15.0 percent nitrogen compared to the theoretical values of 47.0, 3.9 and 14.9 percent, respectively.

*Example 9.—N-acetyl 3,5-dinitro-2-methoxybenzamide*

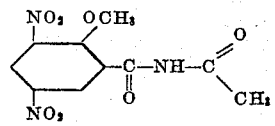

24.1 grams of 2-methoxy-3,5-dinitrobenzamide (melting at 170° C.), 104 milliliters of acetic anhydride and 1 milliliter of concentrated sulfuric acid were mixed together and warmed at a temperature of about 60° C. for a period of 30 minutes. The reaction mixture was then cooled to −20° C. during which period a white precipitate formed therein. This precipitate was separated by filtration, washed with water and dried under vacuum. As a result of these operations, there was obtained an N-acetyl 3,5-dinitro-2-methoxybenzamide product as a crystalline solid melting at 168.6°–170.0° C. with decomposition. This product was found to contain 42.7 percent carbon and 3.1 percent hydrogen compared to the calculated values of 42.4 and 3.2 percent, respectively.

Example 10.—N-acetyl-N-propyl 3,5-dinitro-2-methylbenzamide

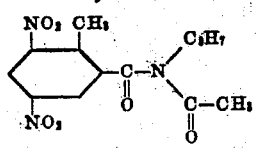

Four grams of N-propyl 3,5-dinitro-2-methylbenzamide (melting at 120° C.), 16.8 grams of acetic anhydride and 2 drops of concentrated sulfuric acid were mixed together and heated at a temperature of 94° C. for a period of 24 hours. The reaction mixture was then poured into a mixture of ice and water to precipitate a product which was separated by filtration. Upon recrystallization from ethanol, there was obtained an N-acetyl-N-propyl 3,5-dinitro-2-methylbenzamide product as a cream colored solid. This solid melted at 114°–114.8° C. and was found to contain 50.6 percent carbon, 4.9 percent hydrogen and 13.2 percent nitrogen compared to the calculated values of 50.5, 4.9 and 13.6 percent, respectively.

Example 11.—N-propionyl-N-propyl 3,5-dinitro-2-methylbenzamide

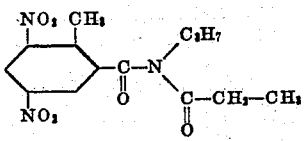

4.3 grams of N-propyl 3,5-dinitro-2-methylbenzamide, 23.0 grams of propionic anhydride and 2 drops of concentrated sulfuric acid were mixed together and heated at a temperature of 94° C. for a period of 72 hours. The resulting solution was poured into a mixture of ice and water to precipitate a product which was then separated by filtration. Upon recrystallization from isopropyl alcohol, there was obtained an N-propionyl-N-propyl 3,5-dinitro-2-methylbenzamide product as a light tan solid which melted at 110.0°–110.6° C. This product contained 52.2 percent carbon, 5.3 percent hydrogen and 12.9 percent nitrogen compared to the theoretical values of 52.0, 5.3 and 13.0 percent, respectively.

Example 12.—N-propionyl 2,4-dinitro-6-methylbenzamide

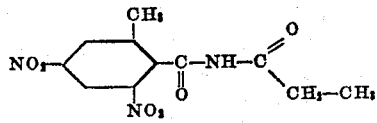

2.25 grams of 2,4-dinitro-6-methylbenzamide (melting at 196° C.), 14.32 grams of propionic anhydride and one drop of concentrated sulfuric acid were mixed together and heated at a temperature of 94° C. for a period of one hour. The resulting solution was poured into a mixture of ice and water to precipitate a product which was separated by filtration. Upon recrystallization from aqueous isopropyl alcohol, there was obtained an N-propionyl 2,4-dinitro-6-methylbenzamide product as a cream colored solid which melted at 169°–170° C. but which resolidified and remelted at 180.5°–182° C. This product was found to contain 47.0 percent carbon, 3.9 percent hydrogen and 15.0 percent nitrogen compared to the theoretical values of 47.0, 3.9 and 15.0 percent, respectively.

Example 13.—N-capryl 3,5-dinitro-2-methylbenzamide

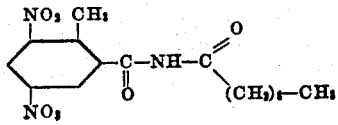

3,5-dinitro-2-methylbenzamide (5.6 grams, 0.025 mole) was dispersed in 32.65 grams (0.1 mole) of capric anhydride and about five drops of concentrated sulfuric acid added thereto. The reaction mixture was then heated with stirring at a temperature of 70° C. for a short period during which a solid material precipitated in the mixture. Heating was thereafter continued at a temperature of 100° C. during which the precipitate dissolved. The reaction mixture was then cooled to precipitate a product as a crystalline solid which was separated by filtration and washed with ether. Upon recrystallization from ethanol, there was obtained an N-capryl 3,5-dinitro-2-methylbenzamide product which was found to melt at 148.0°–148.3° C. and contained 57.37 percent carbon, 6.54 percent hydrogen and 11.18 percent nitrogen compared to the calculated values of 57.00, 6.64 and 11.07 percent, respectively.

In a similar manner other N-alkanoyl dinitrobenzamide may be prepared of which the following are representative:

N-butyryl 3,5-dinitro-2-methylbenzamide (melting at 172°–172.5° C.) by the reaction of 3,5-dinitro-2-methylbenzamide and butyric anhydride.

N-isobutyryl 3,5-dinitro-2-methylbenzamide (melting at 177°–178.7° C.) by the reaction of 3,5-dinitro-2-methylbenzamide and isobutyric anhydride.

N-propionyl 3,5-dinitro-2-ethylbenzamide by the reaction of 2-ethyl-3,5-dinitrobenzamide and propionic anhydride.

N-acetyl 2,4-dinitro-6-methylbenzamide by the reaction of 2,4-dinitro-6-methylbenzamide and acetic anhydride.

N-acetyl 2,4-dinitro-6-methoxybenzamide by the reaction of 2,4-dinitro-6-methoxybenzamide and acetyl chloride.

N-butyryl 2,4-dinitro-6-ethylbenzamide by the reaction of 2,4-dinitro-6-ethylbenzamide and butyryl bromide.

N-heptanoyl-N-ethyl 2,4-dinitro-6-methylbenzamide by the reaction of N-ethyl 2,4-dinitro-6-methylbenzamide and heptanoic anhydride.

N-valeryl 2,4-dinitrobenzamide by the reaction of 2,4-dinitrobenzamide (melting at 188° C.) and valeric anhydride.

The new compounds of the present invention are effective as herbicides for the killing of weeds. They are also valuable as parasiticides and are adapted to be employed for the control of insect and fungal organisms such as *Alternaria solani*. For such use, the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents in oil-in-water emulsions or aqueous dispersions with or without the addition of dispersing and emusifying agents. In representative operations, good controls of the growth of the seeds and emerging seedlings of Japanese millet and wild oats have been obtained with N-acetyl 3,5-dinitro-2-methylbenzamide when applied at the rate 50 pounds per acre to soil previously planted with said plant species.

The dinitrobenzamides employed as starting materials in the present invention are crystalline solids which are somewhat soluble in many organic solvents and of very low solubility in water. The 3,5-dinitrobenzamides and the 2-alkyl-3,5-dinitrobenzamides may be prepared by the reaction of 3,5-dinitrobenzoic acid or a 2-alkyl-3,5-dinitrobenzoic acid with thionyl chloride ($SOCl_2$) or phosphorus pentachloride to produce the corresponding acid chlorides. The acid chlorides are then reacted with an excess of aqueous ammonia or a suitable amine to obtain the desired dinitrobenzamide or N-lower alkyl dinitrobenzamide compounds.

The 2,4-dinitrobenzamides and 6-alkyl-2,4-dinitrobenzamides employed as starting materials in accordance with the teachings of the present invention may be prepared by the diazotization of 2,4-dinitroaniline or a 6-alkyl-2,4-dinitroaniline to form the corresponding diazonium salt which is then reacted with cuprous or nickelous cyanide to obtain the corresponding nitrile. Subsequent hydrolysis of the nitrile results in the formation of the corresponding dinitrobenzoic acid. The acid is then reacted with thionyl chloride to obtain the acid chloride which is reacted with ammonia or a lower alkyl amine to produce the desired benzamide compound.

The 2-methoxy-3,5-dinitrobenzamides and N-lower alkyl 2-methoxy-3,5-dinitrobenzamides are prepared by the nitration of 2-chlorobenzoic acid to obtain the corresponding 2-chloro-3,5-dinitrobenzoic acids which are then reacted with phosphorus pentachloride to form the corresponding acid chlorides. These acid chlorides are then reacted with aqueous ammonia or a suitable amine in the proportion of 2 moles of ammonia or amine per mole of acid chloride. Since the acyl chloride is more reactive than the ring chlorine, such reaction results in the formation of 2-chloro-3,5-dinitrobenzamides or N-lower alkyl 2-chloro-3,5-dinitrobenzamides. The latter benzamide compounds thereafter may be reacted with an alkali metal methoxide whereby a methoxy group is substituted for chlorine in the 2-chloro-3,5-dinitrobenzamide compound.

The 6-methoxy-2,4-dinitrobenzamides or N-lower alkyl 6-methoxy-2,4-dinitrobenzamides may be prepared by the diazotization of 6-methoxy-2,4-dinitroaniline to form the corresponding diazonium salt which is then reacted with cuprous or nickelous cyanide to obtain the corresponding nitrile. The nitrile is thereafter hydrolyzed to the corresponding benzoic acid, the benzoic acid converted to the acid chloride and the acid chloride reacted with ammonia or an amine as previously described to obtain the desired benzamide compounds.

The preferred embodiments of the present invention are the N-alkanoyl dinitrobenzamides wherein the alkanoyl groups contain up to ten carbon atoms.

We claim:
1. An N-lower alkanoyl dinitrobenzamide corresponding to the formula

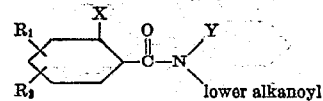

wherein $R_1$ and $R_2$ represent nitro groups which occupy one pair of the 2,4- and 3,5-positions on the benzene ring, X represents a member of the group consisting of hydrogen, methoxy, methyl and ethyl and Y represents a member of the group consisting of hydrogen and lower alkyl.
2. N-acetyl 3,5-dinitrobenzamide.
3. N-propionyl 3,5-dinitrobenzamide.
4. N-acetyl 3,5-dinitro-2-methylbenzamide.
5. N-propionyl 3,5-dinitro-2-methylbenzamide.
6. N-acetyl N-methyl 3,5-dinitro-2-methylbenzamide.

References Cited in the file of this patent
UNITED STATES PATENTS

| | | |
|---|---|---|
| 2,235,480 | Graenacher et al. | Mar. 18, 1941 |
| 2,436,130 | Weissberger et al. | Feb. 17, 1948 |
| 2,439,352 | Weissberger et al. | Apr. 6, 1948 |
| 2,477,816 | Masset | Aug. 2, 1949 |
| 2,619,480 | Lindenfelser et al. | Nov. 25, 1952 |

FOREIGN PATENTS

| | | |
|---|---|---|
| 297,875 | Germany | May 26, 1917 |
| 748,781 | Great Britain | May 9, 1956 |

OTHER REFERENCES

Frear: Chem. of the Insecticides, 3rd ed. (1956), p. 385.

Chem. Abstracts, vol. 41, p. 3909i (1947), citing Thompson et al., Botan. Gazette, vol. 107, pp. 476–507 (1946).

Berichte, vol. 51, Hahn et al., pp. 1437 and 1445 (1918).

Brady et al.: Jour. Chem. Soc. (1926), pp. 2411–2415.